Figure 1:
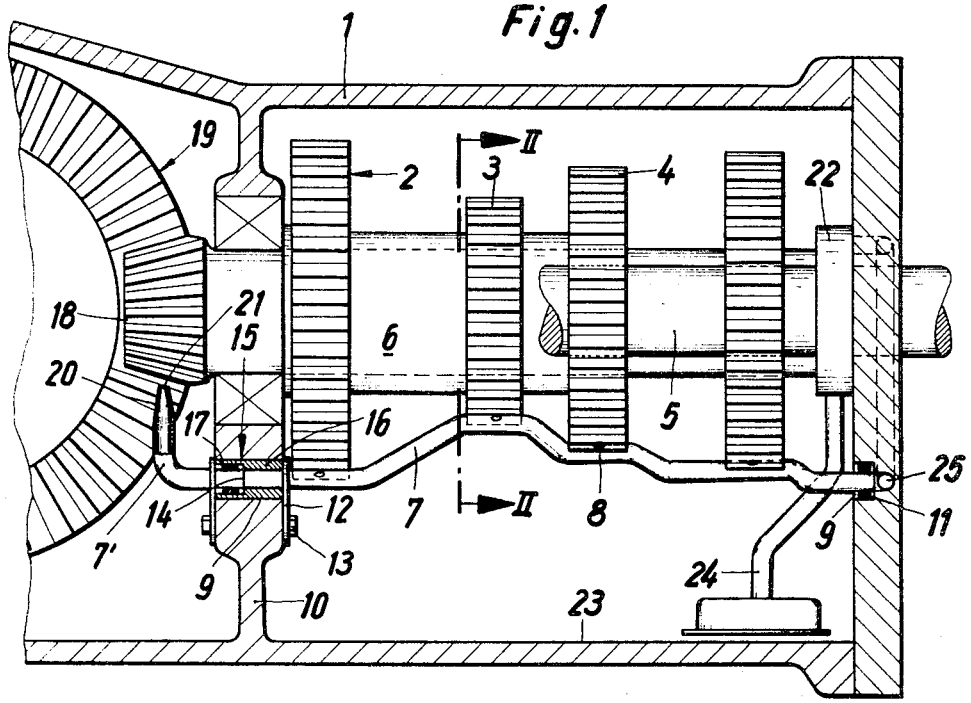

United States Patent [19]

Hausinger

[11] 3,738,452
[45] June 12, 1973

[54] LUBRICATING ARRANGEMENT FOR CHANGE-SPEED TRANSMISSIONS

[75] Inventor: Otto Hausinger, Gerlingen, Germany

[73] Assignee: Dr. Ing h.c. F. Porsche KG, Stuttgart-Zuffenhausen, Germany

[22] Filed: Aug. 26, 1971

[21] Appl. No.: 175,211

[30] Foreign Application Priority Data
Aug. 26, 1970 Germany.................. P 20 42 206.4

[52] U.S. Cl................................. 184/6.12, 74/467
[51] Int. Cl.............................................. F01m 1/08
[58] Field of Search........................... 285/158, 211; 184/6.12; 74/467, 468

[56] References Cited
UNITED STATES PATENTS

| 1,429,466 | 9/1922 | Turnbull | 184/6.12 |
| 1,334,844 | 3/1920 | Day | 74/467 |
| 2,697,965 | 12/1954 | Armitage | 184/6.12 X |
| 2,840,186 | 6/1958 | Nyland | 184/6.12 |
| 3,281,155 | 10/1966 | Kauffman | 285/158 X |

FOREIGN PATENTS OR APPLICATIONS

| 905,290 | 4/1945 | France | 184/6.12 |
| 472,709 | 3/1929 | Germany | 285/211 |
| 316,376 | 11/1919 | Germany | 184/6.12 |

Primary Examiner—Manuel A. Antonakas
Attorney—Craig, Antonelli & Hill

[57] ABSTRACT

A lubricating system for change-speed transmissions, especially of vehicles with spray nozzles connected with a pressure line system for the gears supported in the transmission housing and the bearing places thereof, whereby one or several pipe lines are used that are installed freely along the pairs of gears between cross walls of the transmission housing and nozzle-like discharge apertures are provided in the pipe lines for each of the gear pairs which are directed against the tooth area in front of the point of tooth engagement.

6 Claims, 2 Drawing Figures

Inventor:

OTTO HAUSINGER

BY Craig, Antonelli & Hill
ATTORNEYS

LUBRICATING ARRANGEMENT FOR CHANGE-SPEED TRANSMISSIONS

The present invention relates to a lubricating system for change-speed transmissions, especially of motor vehicles with spray nozzles connected to a pressure line system for gears supported adjacent one another in a transmission housing or the bearing places thereof.

The aim of the present invention is the lubrication of the gears and shaft bearings for change-speed transmissions for vehicles.

It is known to lubricate gear transmissions by spray nozzles connected to a pressure line system, which are arranged perpendicularly to the axis of rotation of the gear wheels and are combined into groups (German Offenlegungsschrift 1,475,546). The spray nozzles of this construction, however, are not directed toward the area of the tooth engagement. Additionally, it is not disclosed in this Offenlegungsschrift how the nozzles are mounted and retained at the transmission housing.

The aim of the present invention, in contradistinction thereto, essentially consists in providing a lubricating system for change-speed transmissions of vehicles which excels by a simple construction and better utilization of the lubricant and in which the feed lines conducting the lubricant can be secured in the transmission housing without great expenditures in work and time.

The underlying problems of the present invention are solved in that the lubricating system consists of one or several pipe lines which are freely installed along the gear pairs between cross walls of the transmission housing and which contain for each gear pair nozzle-like discharge apertures which are directed toward tooth areas in front of the point of tooth engagement. Advantageously, the pipe lines which are supported exclusively at or in the cross walls of the transmission housing and the cover thereof, are provided in the plane of each of the pair of gear wheels disposed adjacent one another of the change-speed transmission with several discharge apertures of which one aperture is directed toward the driving gear and the other aperture toward the driven gear. It is of particular advantage that the pipe lines extend in the gap between the driving and the driven gear and are retained at an approximately constant distance with respect to the associated point of mesh or tooth engagement of each of the gear pairs. For a change-speed transmission combined with a differential gear, which includes a bevel gearing, it is appropriate to direct the discharge apertures transversely to the pipe plane toward the gear pairs of the change-speed transmission and toward the bevel gearing of the differential gear. Advantageously, the pipe lines are retained in bores of the bearing webs of the transmission housing with the use of elastic intermediate rings. A further advantage resides in that one end of the pipe line is provided with a plug connection.

The advantages obtained with the present invention consist especially in that an improved cooling and lubrication of the transmission is achieved by the characterized construction of the lubricating system due to the constant circulation of the lubricant and the continuous lubricant supply of the bearing places. Each gear pair to be lubricated of the transmission can be supplied safely with the lubricant by the simple arrangement and construction of the pipe lines involving slight expenditures, without having to install complicated and expensive lubricant ducts in the housing or in the drive shafts. Additionally, lubricant bores in the gear for the tooth flank lubrication can be dispensed with whereby the rigidity of the gears is increased.

Simultaneously, the shape of the pipe lines can be matched to the individual speed steps of the drive shafts which is favorable in particular in connection with change-speed transmissions of racing cars, whose gear sets have to be matched to the prevailing race course. Due to the simple mounting of the pipe lines in the transmission housing, the pipe lines can be readily and rapidly interchanged at any time without having to disassemble the drive shafts.

Figure 2:
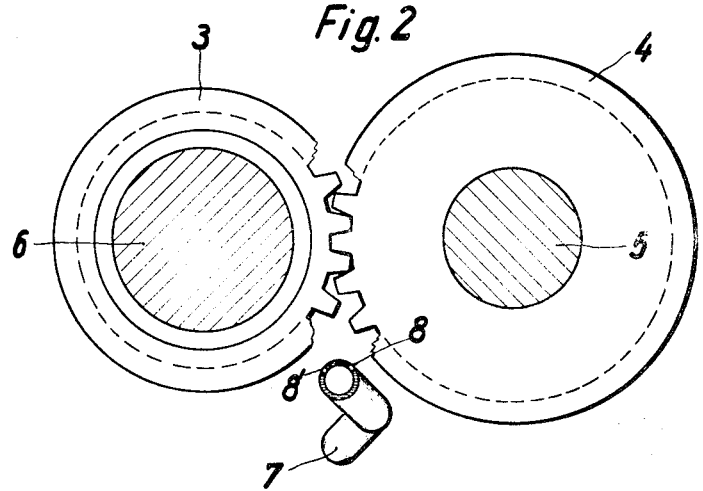

These and further objects, features, and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through a change-speed transmission for vehicles with a lubricating installation in accordance with the present invention; and FIG. 2 is a cross-sectional view, on an enlarged scale, through a pair of gears of the change-speed transmission, taken along line II—II of FIG. 1.

Referring now to the drawing, wherein like reference numerals are used throughout the two views to designate like parts, in a housing 1 of a change-speed transmission 2 with dry sump lubrication, the gears 3, 4, forming the individual speeds or transmission ratios are supported in a conventional manner on the drive shaft 5 and the driven shaft 6. A pipe line 7 is arranged laterally to the drive shaft 5 and the driven shaft 6 as viewed in the direction of rotation of the latter. The pipe line 7 serves for the lubricant feed to the tooth flanks of each of the gears 3, 4 and for the lubrication of the shaft bearings of the shafts 5 and 6. For this purpose, the pipe line 7 is provided within the area of the lubricating places with several nozzle-like apertures 8, 8' which are so arranged that the lubricant is supplied for the tooth flank lubrication of the gears 3, 4 in meshing engagement with one another in front of the point of tooth engagement. The pipe line 7 is supported in bores 9 of the walls or the bearing webs 10 of the transmission housing 1 under interposition of elastic rings 11. In order to supply a sufficient quantity of lubricant against the tooth flanks, the shape of the pipe lines 7 is constructed corresponding to the tooth graduation of the gears 3, 4 so that the apertures 8, 8' of the pipe line 7 are arranged approximately at constant distance to the individual lubricating places. The pipe line 7, for the purpose of mounting in the bores 9 of the transmission housing 1, is provided with a mounting plate 12 which is secured by means of a screw 13 adapted to be inserted into the wall 10 of the transmission housing 1. One end 14 of the pipe line 7 is provided with a conventional plug coupling 15 which consists of a cylindrical sleeve 16. It is thereby possible to connect several pipe lines 7, 7' with one another in a simple manner in that only a sealing ring 17 is placed over the discharge end of the associated pipe line 7' and is inserted into the sleeve 16 of the plug coupling 15. The discharge end 20 of the pipe line 7' is constructed conically for the lubrication of the tooth flanks of the bevel gearing 18 of the differential gear generally designated by reference numeral 19 and is provided with a further nozzle-like aperture 21 which is directed toward tooth flanks of the gears of the bevel gearing 18. The lubricant supply takes place by means of a lubricating pump 22 driven from the drive shaft 5, which draws-in lubricant from the transmission sump 23 by way of a suction line 24 and supplies the pipe lines 7, 7' with lubricant by way of a distributor channel 25 connected to the pipe lines 7, 7' and installed in the transmission housing 1.

During starting of the vehicle, the lubricating pump 22 is driven by the drive shaft 5. The lubricant pump 22 thereby sucks in lubricant out of the transmission sump 23 of the change-speed transmission 2 by way of the suction line 24 and supplies the same by way of the distributor channel 25 installed in the transmission housing 1 to the pipe line 7, 7'. The lubricant is forced by the pressure produced by the pump 22 through the apertures 8, 8', 21 provided in the pipe line 7, 7' within the area of the lubricating places so that the lubricant is sprayed jet-like toward the lubricating places. The lubricant not necessitated for the direct lubrication thereby cools the lubricating places and drips back into the sump of the transmission housing 1.

In case of an eventually occurring failure of the lubricating supply, for example, in case the nozzle-like discharge apertures 8, 8', 21 of the pipe lines 7, 7' become clogged up, only the screw 13 has to be disconnected from the transmission housing 1. Thereafter, the pipe line 7 can be displaced toward the right as viewed in FIG. 1 for such a distance until it can be removed out of the bore 9 of the bearing web 10 and can be cleaned or exchanged. These measures also take place when a change in the gear ratio is necessary for the purpose of a larger or smaller transmission ratio and thereby a pipe line has to be installed corresponding to the changed gear graduation. The installation takes place in both cases analogously in a reverse sequence.

While I have shown and described only one embodiment in accordance with the present invention, it is understood that the same is not limited thereto, but is susceptible of numerous changes and modifications as are known to those skilled in the art, and I therefore do not wish to be limited to the details shown and described herein, but intend to cover all such changes and modifications as are encompassed by the scope of the appended claims.

What I claim is:

1. A lubricating installation for change-speed transmissions, especially for transmissions of vehicles having spray nozzle means connected with a pressure line system for lubricating a plurality of gear pairs supported between cross-wall means of a transmission housing, characterized in that the lubricating installation includes pipe-line means placed freely along the gear pairs between the cross-wall means of the transmission housing, in that the pipe line means are provided with nozzle-like discharge aperture means for each of the gear pairs, said discharge aperture means being directed against the tooth area of respective gears in front of the point of meshing engagement of the teeth thereof, and in that the pipe-line means is supported exclusively at parts consisting of the cross-wall means of the transmission housing and a cover of the transmission housing and is provided with several discharge aperture means in the plane of each of the gear pairs arranged adjacent one another of the change-speed transmission, of which one aperture means is directed against a driving gear and the other aperture means is directed against the driven gear of the respective gear pair.

2. A lubricating installation according to claim 1, characterized in that the pipe line means extends in the gap between the driving and driven gear and is retained at an approximately constant distance relative to the associated point of tooth engagement of each of the gear pairs.

3. A lubricating installation for a change-speed transmission combined with a differential gear which includes a bevel gearing means according to claim 2, characterized in that the discharge aperture means are directed transversely to the pipe plane against the gear pairs of the change-speed transmission and against the bevel gearing means of the differential gear.

4. A lubricating installation according to claim 3, characterized in that the pipe line means is retained in bores of bearing webs of the transmission housing by means of elastic intermediate rings.

5. A lubricating installation according to claim 4, characterized in that one end of the pipe line means is provided with a plug-type connecting means.

6. A lubricating installation according to claim 1, characterized in that one end of the pipe line means is provided with a plug-type connecting means.

* * * * *